United States Patent [19]
Kraft

[11] Patent Number: 4,828,352
[45] Date of Patent: May 9, 1989

[54] S-Z STRANDED OPTICAL CABLE
[75] Inventor: Heinrich A. Kraft, Hickory, N.C.
[73] Assignee: Siecor Corporation, Hickory, N.C.
[21] Appl. No.: 708,017
[22] Filed: Mar. 4, 1985
[51] Int. Cl.[4] .............................................. G02B 6/44
[52] U.S. Cl. ................................................ 350/96.23
[58] Field of Search ................ 350/96.23, 96.22, 96.21
[56] References Cited

U.S. PATENT DOCUMENTS

| | | | |
|---|---|---|---|
| 4,178,069 | 12/1979 | Anderson et al. | 350/96.23 |
| 4,331,379 | 5/1982 | Oestreich et al. | 350/96.23 |
| 4,456,331 | 6/1984 | Whitehead et al. | 350/96.23 |
| 4,557,558 | 12/1985 | Bresser | 350/96.23 |

Primary Examiner—William L. Sikes
Assistant Examiner—Robert E. Wise
Attorney, Agent, or Firm—Roy B. Moffitt

[57] ABSTRACT

Fiber optic cable containing, (a) a core of S-Z stranded strands composed of first and second alternatingly repeating and essentially equal first and second sections, each of the first sections having a common direction and degree of lay substantially equal to but opposite to that of the second sections and (b) a sheath circumscribing the fibers containing marks on its outermost surface essentially transversely co-extensive with that portion of the optical fiber where the first section joins the second section.

12 Claims, 5 Drawing Sheets

FIG. 1
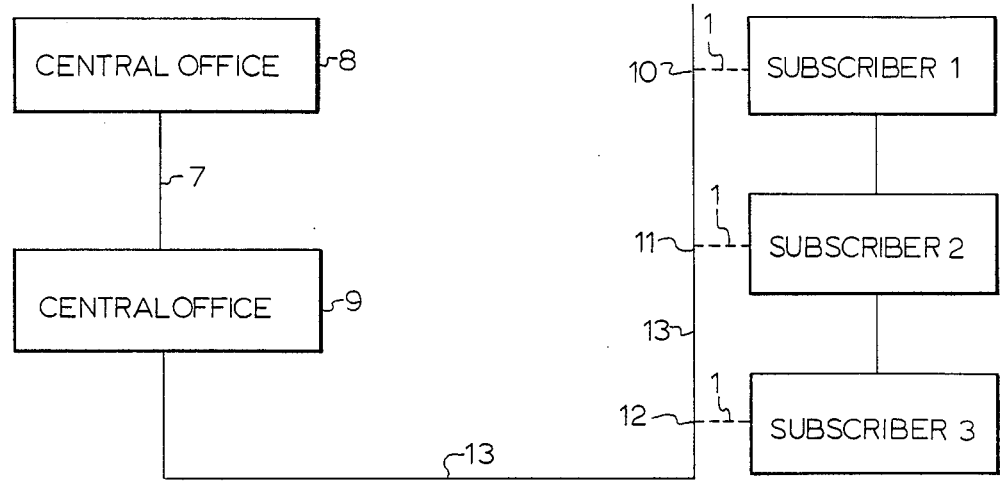
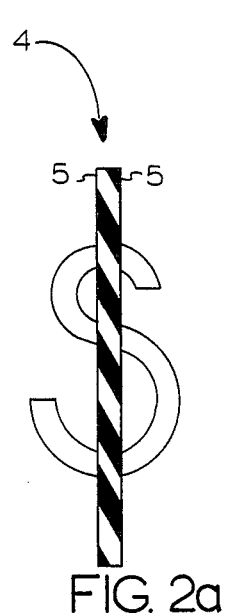
FIG. 2a
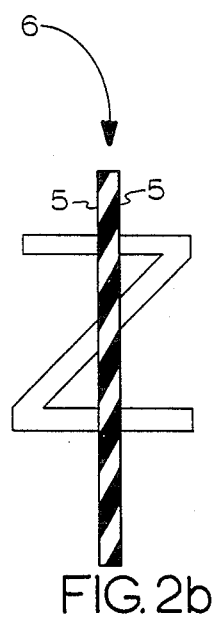
FIG. 2b
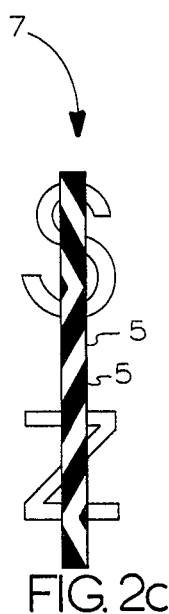
FIG. 2c

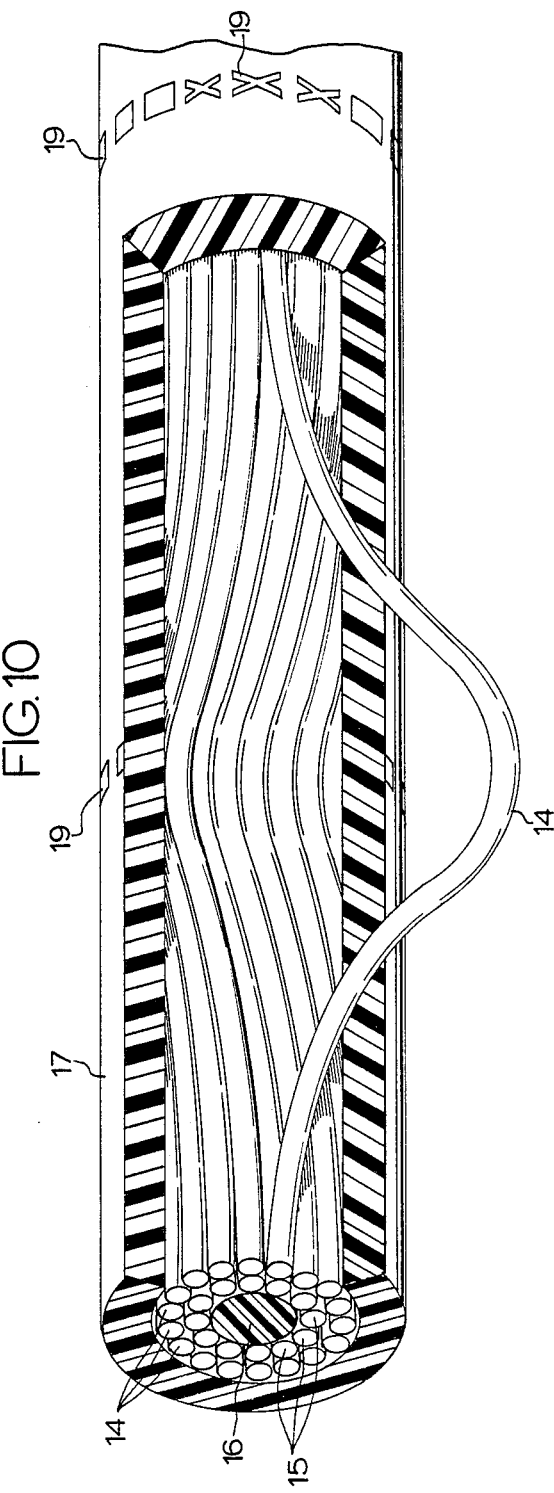
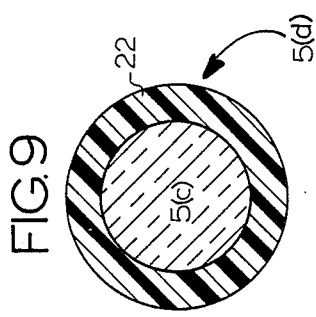
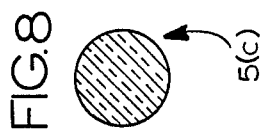

S-Z STRANDED OPTICAL CABLE

BACKGROUND OF THE INVENTION

Fiber optic cable to which telephone subscribers are connected (spliced) is generally called a distribution cable. Often it is the case that one must make a connection adjacent to the subscriber's premise to a fiber in the distribution cable at a place other than that at the cable ends. With current cable designs, it is often awkward and frustrating to tap or splice into an optical fiber in a fiber optic cable other than at the cable ends because, when the cable core is exposed by cutting away the jacket or sheath, the fibers are usually found to be tightly held in place due to the helical construction of the cable core. Thus, there is usually little or no excess fiber length that one can utilize, i.e., a fiber can not be pulled away from its core to facilitate easy handling without chances of damage to the other fibers in the core. It is towards the solution of this problem that the present invention is directed.

BRIEF SUMMARY OF THE INVENTION

The invention is a fiber optic cable containing S-Z stranded strands that include optical fibers (for example but not by way of limitation in either a loose tube or a tightly buffered mode). S-Z stranded loose tubes (containing optical fiber(s) stranded in any way) or tightly buffered optical fibers contain first and second alternatingly repeating and essentially equal first and second sections, each of the first sections having a common direction and degree of lay substantially equal to but opposite to that of the second sections. The S-Z stranded tubes or tightly buffered optical fibers as above described are circumscribed by a sheath having marks on its outermost surface essentially transversely coextensive with that portion of the tubes or tightly buffered optical fibers where the first sections join the second sections. In a S-Z stranded optical cable, the buffer tube length or tightly buffered fiber length is longer than the length of the cable, making slack available potentially in the fibers at the reversal points of the stranding, i.e., each portion of the tightly buffered optical fiber or tube where the first section joins the second section. If the sheath is cut away at the reversal point, the buffer tube or tightly buffered fibers there are not constrained by any helical configuration. Using such a mark or marks permits a craftsman to know where, in the cable, excess fiber is available for ease in making connections other than at the cable ends.

BRIEF DESCRIPTION OF THE DRAWINGS

FIG. 1 is a schematic representation of a telephone system involving two central offices, a distribution cable and a plurality of subscribers.

FIGS. 2(a), 2(b) and 2(c) are schematic representations of a twisted member employing strands twisted or stranded together in various modes: namely, FIG. 2(a) is a member having strands of a "S" or left-handed lay; FIG. 2(b) is a member having strands of a "Z" or right-handed lay; and FIG. 2(c) is a member having strands of a "S-Z," both right and left-handed lay.

FIGS. 6, 7, and 9 are cross sectional views of buffered optical fiber and loose tube optical fiber construction that may be used in the cables of FIGS. 5 and 10.

FIG. 8 is an enlarged cross sectional view of the glass fiber 5(c) of FIGS. 6, 7 and 9.

FIG. 10 is a partial cutaway isometric view of another embodiment of the cable of the invention.

DETAILED DESCRIPTION OF THE INVENTION

Figure 3:
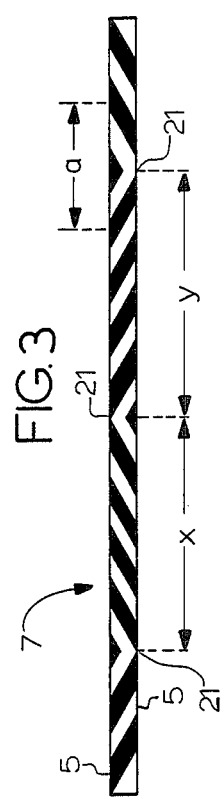
FIG. 3 is a schematic representation of a S-Z member of FIG. 1(c) stranded so that the sum of the right-handed and left-handed lays is zero.

FIG. 1 is a schematic representation of a typical telephone distribution system, including two central offices (elements 8 and 9) connected together by communications cable 7. From central office 9 distribution cable 13 reaches out to subscriber 1, 2 and 3. It will be noted that subscriber 1 is spliced into distribution cable 13 by means of drop wire 1 at location 10 and in a like manner subscriber 2 is spliced into distribution cable 13 at location 11 and subscriber 3 is spliced into distribution cable 13 at location 12. Neither location 10, 11 or 12 are at the cable end, they being somewhere in between cable ends.

Element 4 of FIG. 2(a) shows a well known "S" type stranded member made up of a plurality of strands 5 twisted together so that the lay of strands 5 is all in one direction, essentially following the median portion of the letter "S." Thus the terminology "S" type. Element 6 of FIG. 1(b) shows a "Z" type stranded member made up of a plurality of strands 5 twisted in such a manner that the lay of such strands are right-handed, i.e., lying in the same direction of the median portion of the letter "Z." Thus, the terminology "Z" stranded. Element 7 of FIG. 1(c) is a "S-Z" type stranded member made up of a plurality of strands 5 stranded in such a way that the lay of the strands 5 is "Z" for a predetermined length of the strand and then, abruptly, the lay of the strands 5 is changed so that the member is "S" stranded for a predetermined length. Thus, the terminology "S-Z" stranded.

The instant invention contemplates a "S-Z" stranded cable, as shown by element 7 of FIGS. 2(c) and 3, such a cable being composed of a "S" type lay of strands for a given length and then a "Z" type of lay of strands for the same length. Strand members 5 are "S-Z" stranded so that they contain first and second alternatingly repeating essentially equal first and second sections, each of said first sections having a common direction and degree of lay substantially equal to but opposite to that of the second section. The first section of stranded cable 7 is denoted by the letter "x" and the second section being denoted by the letter "y" with "x" being "S" stranded and length "y" being "Z" stranded and "x" meeting or joining "y" at point 21. Length "a" (FIG. 3) schematically represents the core length that may be exposed by removing a jacket or sheath (not shown in FIG. 3 but shown in FIGS. 5 and 10) to expose point 21 and strands 5.

Figure 4:
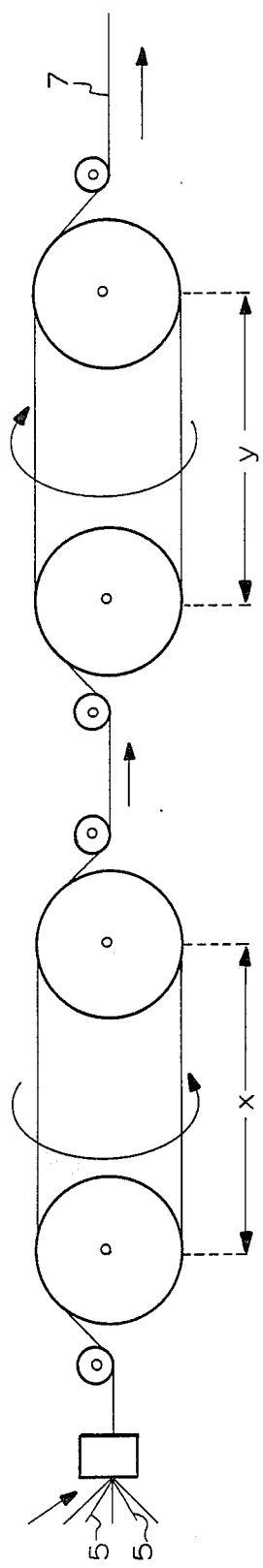
FIG. 4 is a schematic representation of prior art apparatus employed in stranding S-Z stranded members.

FIG. 4 shows conventional prior art apparatus "breathing accumulators" used to "S-Z" strand strands 5. For the purpose of example, length "x" substantially equals length "y," lengths "x" and "y" being manufactured by "breathing accumulators. Another apparatus adapted to make "S-Z" stranded members is shown by U.S. Pat. No. 3,823,536, such disclosure being incorporated herein by reference.

Strands 5, used to form a single strand layer or layers 14 and/or 15 (see FIG. 5) may be composed of tightly buffered optical glass fibers element 5(d) per se and/or plastic tubes with optical glass fiber(s) 5(c) loosely disposed therein either per se as shown by element 5(b) or tube 19 filled with grease as shown by element 5(a). The tube optical fiber construction shown by elements 5(a) and 5(b) are known to the industry as loose tube type construction.

Figure 5:
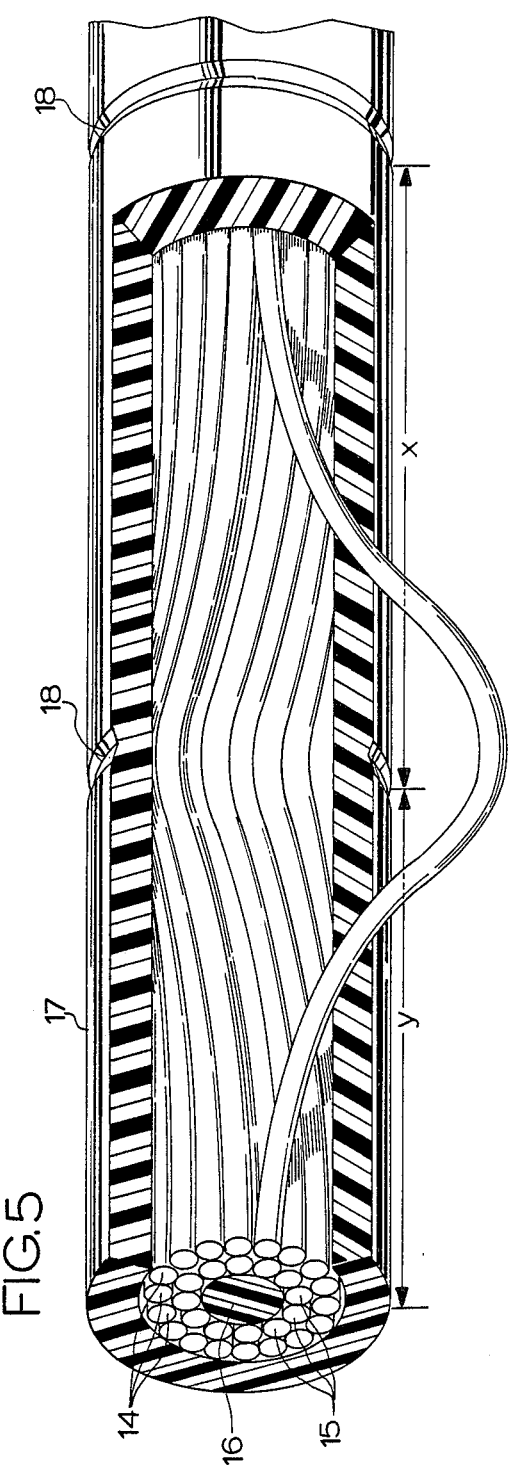
FIG. 5 is a partial cutaway isometric view of one embodiment the cable of this invention.

Referring to FIG. 5, there is shown in partial cutaway view a cable composed of a center strength member 16, shown as being a plastic center strength member made out of material such as kevlar. Other strength member materials such as metal can also be used. Surrounding center strength member 16 are first (element 15) and second (element 14) layers of fiber optic strands having a structure like that shown by element(s) 5(a), 5(b) and/or 5(d). At least the outer layer is S-Z stranded. The optical fiber layers 14 and 15 are circumscribed by a plastic sheath 17 in which there are plurality of grooves 18 circumscribing jacket 17 at the point(s) in the general vicinity where the first section of the S-Z stranding joins the second section. The cable of FIG. 10 is similar to the cable of FIG. 5, except there are printed or painted stripes 21 or other marking indicia instead of grooves 18.

Figure 7:
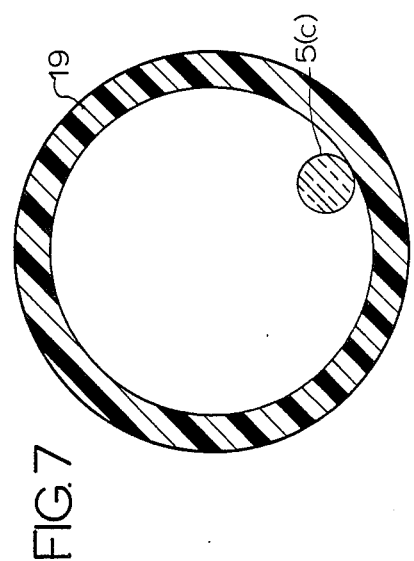
Figure 6:
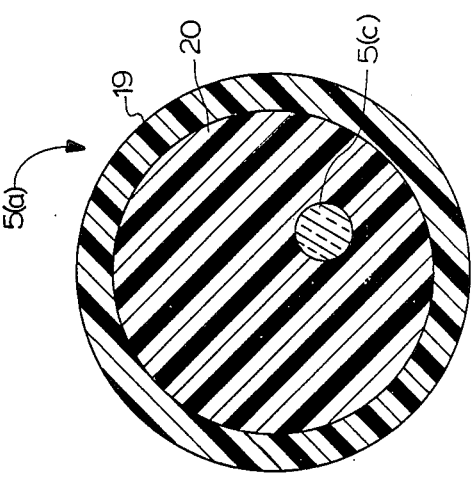

Construction of different types of strands that comprise elements 14 and/or 15 are shown in FIGS. 6, 7 and 9 as elements 5(a), 5(b) and 5(d) respectively. Elements 5(a) and 5(b) respectively show the typical prior art "loose tube" type structure. This structure provides a plastic tube 19 in which there is loosely disposed optical fiber 5(c). If desired, the space delimited by tube 19, not otherwise occupied by optical fiber(s) 5(c), is filled by a grease-like material 20. It is to be understood that more than one optical fiber can be disposed in tube 19, either stranded or not. Usual practice is to use a glass fiber 5(c) circumscribed by a thin layer of thermosetting or thermoplastic resin (not shown) of a wall thickness so that the gross outside diameter of the plastic covered glass fiber is between 250 and 500 microns.

A tight buffered optical fiber (without tube 19), such as that shown by element 5(d) of FIG. 9 may be used to make stranded layers 14 and/or 15. Tightly buffered optical fibers, like that of element 5(d), have a plastic wall (element 22) of a thickness so that the gross outside diameter of the plastic coated glass fiber is an approximate minimum of 500 microns.

Figure 11A:
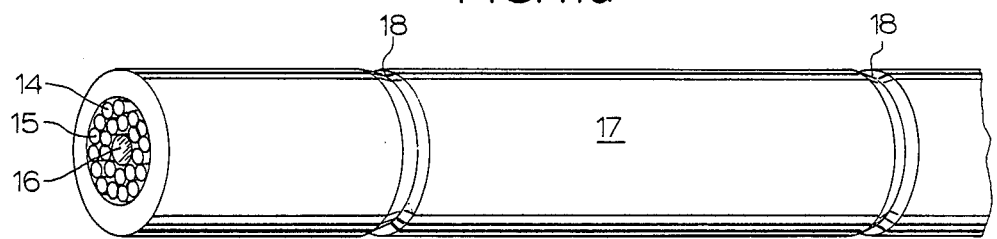
FIGS. 11(a) and 11(b) and FIGS. 12(a) and 12(b) are side elevation views of different embodiments of the cable of FIGS. 5 and 10.
Figure 11B:
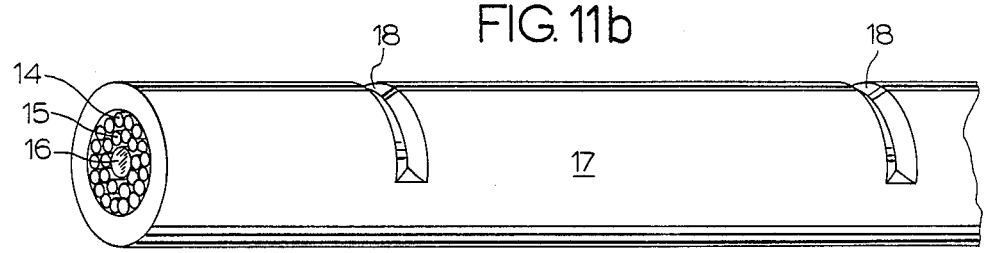
Figure 12A:
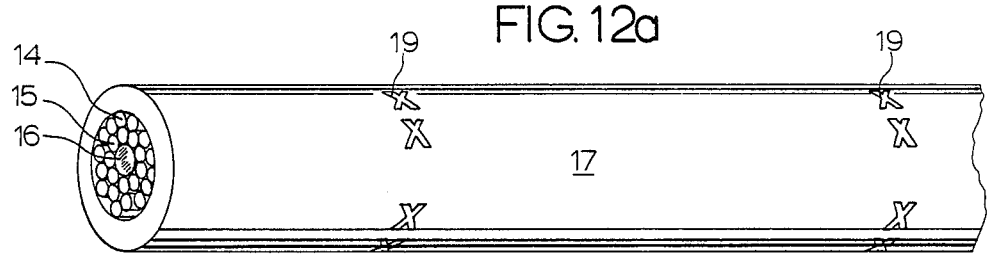
Figure 12B:
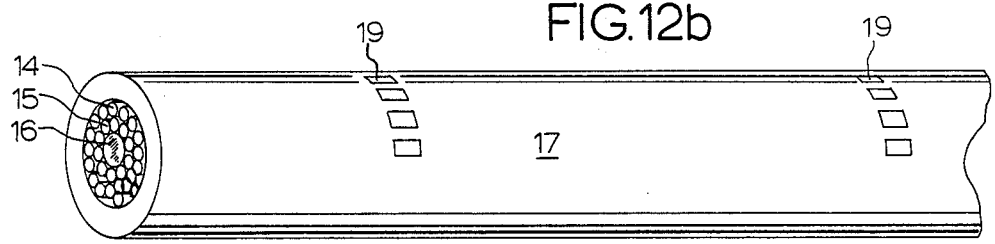

Viewing FIGS. 11(a) and (b), it will be noted that grooves 18 can be made to completely circumscribe sheath 17, as is the case in FIG. 11(a), or may be disposed so they only partially circumscribe sheath 17 as shown in FIG. 11(b). Alternatively, grooves 18 can be replaced by other indicia or marks such as a printed or painted stripe, words or symbols, that may completely circumscribe jacket 17 such as that shown in FIG. 12(a), a mark or stripe that only partially circumscribes sheath 17, such as shown by element 19 in FIG. 12(b), or one that is longitudinally disposed.

Either stripes 18 or grooves 19 (or some other indicia or marking), either partially or completely circumscribing the outer sheath of a fiber optic cable, are placed or printed in the outermost surface of the cable sheath in the proximity where the S meets the Z in the S-Z stranding of the fiber optic cable will suffice.

Viewing FIGS. 5 and 10, it will be noted that there has been shown a fiber optic cable containing, (a) S-Z stranded strands 5(a), 5(b) and 5(d), (either in a loose tube or a tightly buffered mode), the S-Z stranded strands containing first and second alternatingly repeating and essentially equal first and second sections, each of the first sections having a common direction and degree of lay substantially equal to but opposite to that of the second sections and (b) a sheath 17 circumscribing the S-Z strands contain stripes or grooves (elements 18 or 19) on its outermost surface essentially transversely co-extensive with that portion of the strands where the first section joins the second section.

What is claimed is:

1. A fiber optic cable comprising:
   (a) a core containing S-Z stranded strands containing optical fibers having first and second alternatively repeating essentially equal first and second sections, each of the first sections having a common direction and degree of lay substantially equal to but opposite to that of the second section; and,
   (b) a sheath circumscribing the core containing on its outermost surface at least one indicator essentially transversely co-extensive with that portion of the strands wherever the first section joins the second section.

2. The fiber optic cable of claim 1 wherein one or more of the strands comprise at least one optical fiber loosely circumscribed by a tube.

3. The fiber optic cable of claim 1 wherein one or more of the strands comprise an optical fiber snugly circumscribed by a plastic jacket.

4. The fiber optic cable of claim 1 wherein the indicator is a mark on the surface of the sheath.

5. The fiber optic cable of claim 4 wherein the indicator circumscribes the sheath.

6. the fiber optic cable of claim 4 wherein the mark is a word or a symbol.

7. The fiber optic cable of claim 1 wherein the indicator is an indentation in the sheath.

8. The fiber optic cable of claim 7 wherein the indicator circumscribes the sheath.

9. The fiber optic cable of claim 7 wherein the mark is a word or symbol.

10. A fiber optic cable of claim 1 wherein the core contains a strength member about which the S-Z stranded strands are disposed.

11. A fiber optic cable comprising:
    (a) a core containing S-Z stranded strands containing optical fibers having first and second alternatingly repeating first and second sections; and,
    (b) a sheath containing the core having at least one indicator on the exterior surface of the sheath to indicate the location of each junction between a first and second strand section.

12. A fiber optic cable as recited in claim 11 wherein the strands are non-adherently disposed within the sheath.

* * * * *